(12) United States Patent
Perez

(10) Patent No.: US 6,644,599 B2
(45) Date of Patent: Nov. 11, 2003

(54) MECHANISM FOR AT LEAST REGIONALLY ADJUSTING THE CURVATURE OF AIRFOIL WINGS

(75) Inventor: Juan Perez, Feldkirchen-Westerham (DE)

(73) Assignee: EADS Deutschland GmbH, Munich (DE)

( * ) Notice: Subject to any disclaimer, the term of this patent is extended or adjusted under 35 U.S.C. 154(b) by 0 days.

(21) Appl. No.: 10/008,779

(22) Filed: Nov. 13, 2001

(65) Prior Publication Data

US 2002/0100842 A1 Aug. 1, 2002

(30) Foreign Application Priority Data

Nov. 11, 2000 (DE) .......................................... 100 55 961

(51) Int. Cl.[7] ................................................ B64C 3/48
(52) U.S. Cl. ...................... 244/219; 244/213; 244/75 R
(58) Field of Search .................................. 244/219, 213, 244/214, 215, 216, 75 R, 211, 212

(56) References Cited

U.S. PATENT DOCUMENTS

| | | | |
|---|---|---|---|
| 2,152,029 A | * 3/1939 | Cone | 114/167 |
| 3,109,613 A | 11/1963 | Bryant et al. | |
| 3,698,668 A | * 10/1972 | Cole | 244/219 |
| 4,113,210 A | 9/1978 | Pierce | 244/219 |
| 4,247,066 A | * 1/1981 | Frost et al. | 244/214 |
| 4,252,287 A | 2/1981 | Zimmer | |
| 4,312,486 A | * 1/1982 | McKinney | 244/215 |
| 6,010,098 A | 1/2000 | Campanile et al. | |
| 6,138,956 A | * 10/2000 | Monner | 244/215 |
| 6,152,405 A | * 11/2000 | Muller | 244/212 |
| 6,276,641 B1 | * 8/2001 | Gruenewald et al. | 244/213 |
| 6,347,769 B1 | * 2/2002 | To et al. | 244/219 |

FOREIGN PATENT DOCUMENTS

| | | | |
|---|---|---|---|
| DE | 197 07 392 | 8/1998 | |
| DE | 19852944 C1 | * 2/2000 | ............. B64C/3/44 |
| FR | 495 650 | 10/1919 | |

* cited by examiner

Primary Examiner—Peter M. Poon
Assistant Examiner—Timothy D Collins
(74) Attorney, Agent, or Firm—Kenyon & Kenyon

(57) ABSTRACT

A variable wing section having an adjustable profile shape extending in the wing-span direction, includes a plurality of torsion boxes, which are positioned in the longitudinal direction, are torsionally stiff about the wing-span direction, and are each constituted of a first wing skin, a second wing skin opposite to it, and at least one spar. The variable wing section includes at least one vertebra, which has a transmission element that is connected to the first wing skin by a pendulum joint in order to compensate for a relative movement between the first wing skin and the at least one vertebra, and which has a vertically spaced-apart point of connection to a drive chord, the length of which may be changed, using a control command. The length of the drive chord is changed as a function of a control signal, and the at least one vertebra is rotated about the wing-span direction, so that the shape of the torsion boxes, and thus the profile shape, are changed in a predetermined manner.

9 Claims, 10 Drawing Sheets

MECHANISM FOR AT LEAST REGIONALLY ADJUSTING THE CURVATURE OF AIRFOIL WINGS

FIELD OF THE INVENTION

The present invention relates to a mechanism for at least regionally adjusting the curvature of airfoil wings or airfoil-wing sections, in particular, those of airplanes.

BACKGROUND INFORMATION

Conventional steering flaps can only be adjusted as rigid wing sections. This does not aerodynamically divert the flow at the wing in an optimum manner. In addition, the load distribution is unfavorable, since the steering flap is pivoted at individual connection points on the wing, so that comparatively large, local stresses occur.

SUMMARY

Therefore, it is an object of the present invention to provide a mechanism for at least regionally adjusting the curvature of airfoil wings, which has a simple and relatively light construction, and allows wing sections to be deformed for steering, maneuvering, stabilizing, or also trimming the airplane.

The above and other beneficial objects of the present invention are achieved by providing a mechanism as described herein.

DETAILED DESCRIPTION

Figure 1:
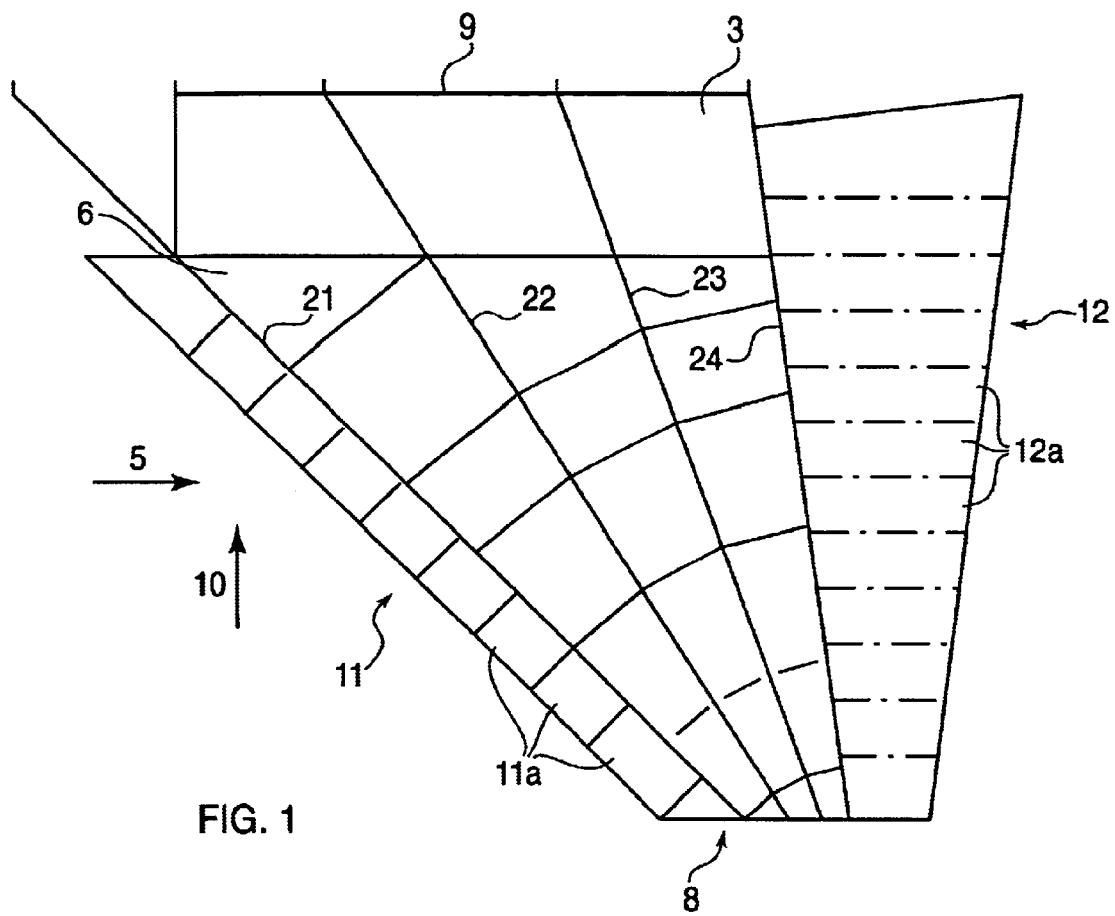
FIG. 1 is a plan view of a wing having a sectionally variable curvature according to an example embodiment of the present invention, the wing having a wing box, on the front and rear ends of which a flexible leading-edge region and trailing-edge region are attached, respectively.
Figure 2:
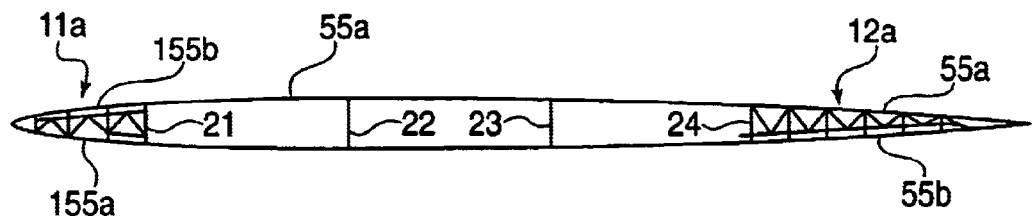
FIG. 2 is a cross-sectional view of the wing illustrated in FIG. 1, in the flow or wing-chord direction.

Illustrated in FIG. 1 is an example embodiment of an airfoil wing or wing 1 of an airplane having a wing box, the present invention being usable for the leading-edge flap or also the trailing-edge flap of the example embodiment. The arrow denoted by reference numeral 5 indicates the wing-chord direction or the approximate flow direction with respect to wing 1. The illustrated wing box 3 includes a wing tip 8 and, for example, a root region 9, and a largely dimensionally stable wing box 6, wing box 6 being attached to the fuselage of the airplane, via or across root region 9. Wing 1 includes a leading-edge region 11, which is in one piece or divided up into a plurality of segments 11a as viewed in its wing-span direction 10, and a trailing-edge region 12, which is in one piece or divided up into a plurality of segments 12a as viewed in its wing-span direction 10. The present invention relates to adjusting the curvature of the profile of the segments. In addition to, or as an alternative to the leading- or trailing-edge regions, the present invention may be used, however, to adjust the curvature of wing box 3 or entire wing 1, as well. In addition, the curvature adjustment of the present invention may also either be applied to just the leading-edge region or just the trailing-edge region. Furthermore, the row of variable leading-edge segments 1a or trailing-edge segments 12a of the present invention does not have to extend across entire wing span 10, but may also just form a zone of the airfoil wing extending in this direction, or a zone of wing leading edge 11 or wing trailing edge 12 extending in this direction.

Wing box 6 may include have a plurality of main spars, e.g., a first 21, a second 22, a third 23, and a fourth 24 main spar, which, in the example embodiment illustrated in FIG. 1, somewhat approach each other in the direction of wing tip 13, in accordance with the decreasing length of wing chord 5 in the direction of wing tip 13. In this context, the number of main spars depends on the application case and the construction type of wing 1.

With reference to FIGS. 3 to 17, it is described below, how the example embodiments of the variable wing section according to the present invention are used for a trailing-edge region 12.

The trailing-edge region 12 illustrated as an example embodiment of a variable wing region according to the present invention is constructed from a plurality of trailing-edge segments 12a, which are positioned next to each other in wingspan direction 10, and are each constituted of several torsion boxes 53 that are positioned one behind the other, as viewed in the longitudinal direction 12c of the wing section or flap region. In a direction perpendicular to its longitudinal flap direction 12c, i.e., in vertical direction 12d, segment 12a is bound by an upper wing skin 55a and a lower wing skin 55b opposite thereto, which are each made of material the expansion of which may be neglected. In the example embodiments illustrated in FIGS. 3 to 18, upper wing skin 55a is the suction-side skin and lower wing skin 55b the pressure-side skin of the wing. The wing skins may be supported by a plurality of spars 52 arranged in longitudinal direction 12c, and determine the profile shape or profile contour of the variable wing section, in which case each of the wing skins may be continuous or made out of segments, the size of which corresponds to segments 12a. The bending resistance of the wing skins about wing-span axis 10 may be selected so that the deformations resulting from the flight loads are tolerable with regard to the required characteristics of the profile. In view of the adjustable deformations of the present invention, a corresponding torsional stiffness about wing-span axis 10 may be ensured. Segment 12a is subdivided into spaces or wing-torsion boxes 53 by at least one spar 52, which sets first 55a and second 55b wing skins apart from each other, and is connected to them by first 52a and second 52b support points or connection points, respectively, which may include hinges or elastic joints. For each segment 12a, first wing skin 55a and second wing skin 55b are accordingly formed between two adjacent spars 52, from wing-skin segments 56a and 56b, which may be parts of a uniform wing skin, or also physically separate segments that make up the specific wing skin. Next to first 50 or second 51 end region, torsion box 53 may include, as an alternative, only one spar 52, when end region 50, 51 supports one side of torsion box 53, itself. The spars have sufficient torsional stiffness in wing-span direction 10. Their connection to the specific wing skin or to joint 69, is also sufficiently stiff, in order to ensure that torsion boxes 53 have the required torsional stiffness about wing-span axis 10.

Figure 3:
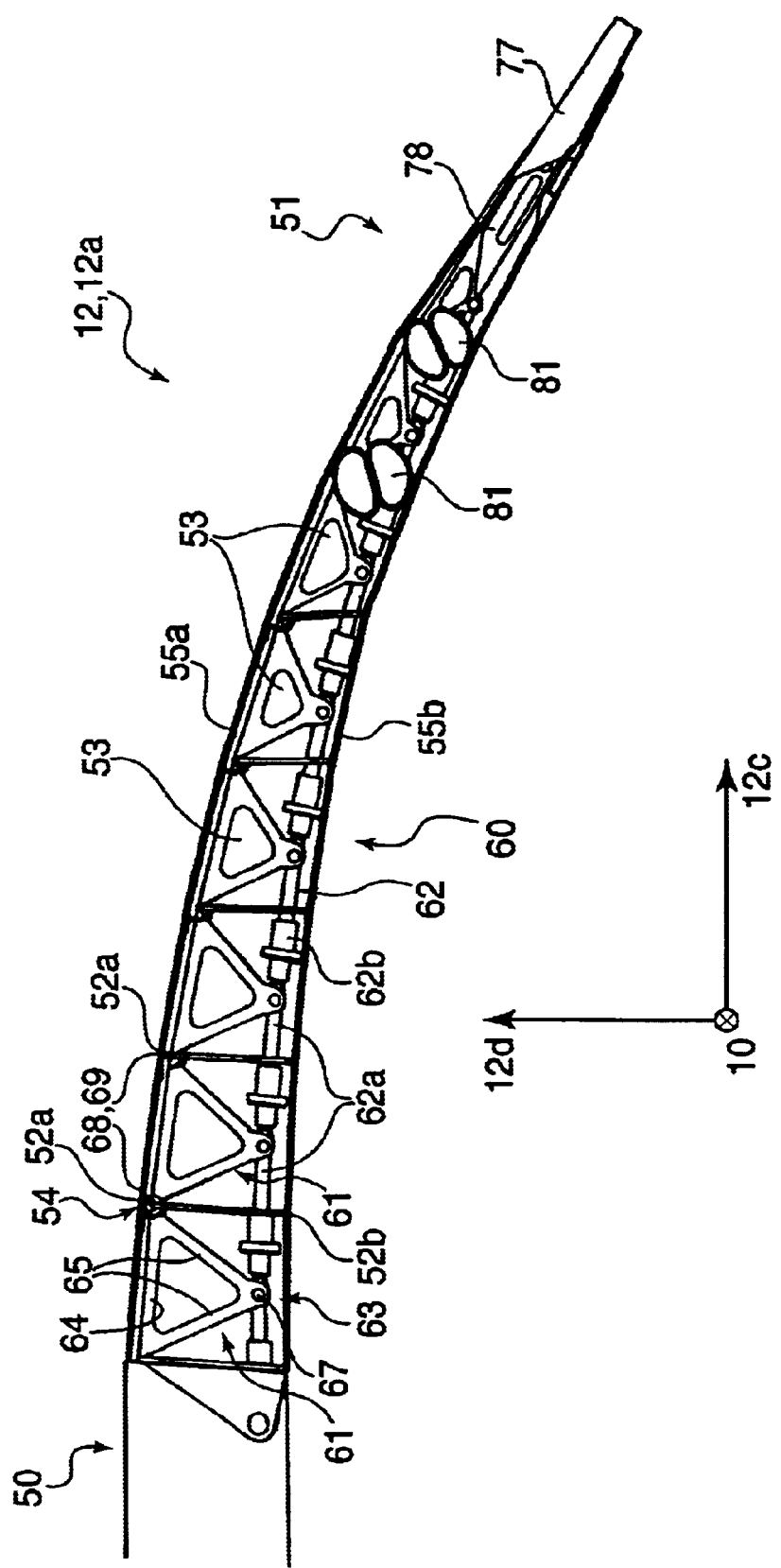
FIG. 3 is a cross-sectional view of the trailing-edge region, in the flow direction, of the wing illustrated in FIG. 1, having stiffening elements and vertebra elements, the positions of which provide the trailing-edge region with a shape that produces high lift for the entire wing.
Figure 4:
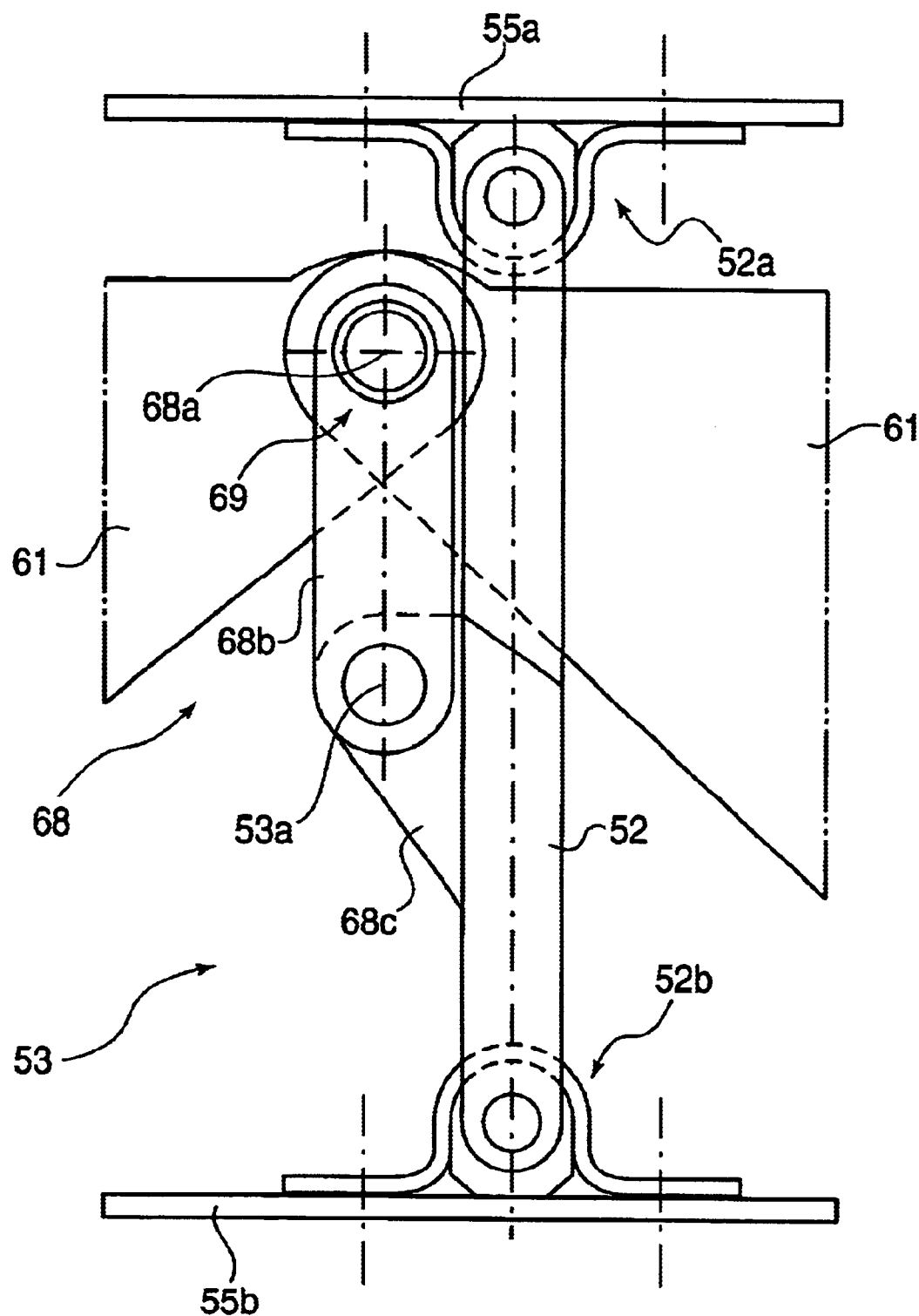
FIG. 4 is a cross-sectional view in the flow direction through a segment of the trailing-edge region, or through a segment of the leading-edge region, having a first example embodiment of a pivot bearing, in order to provide a connection between two vertebra elements, and between these vertebra elements and a spar of a torsion box.
Figure 5:
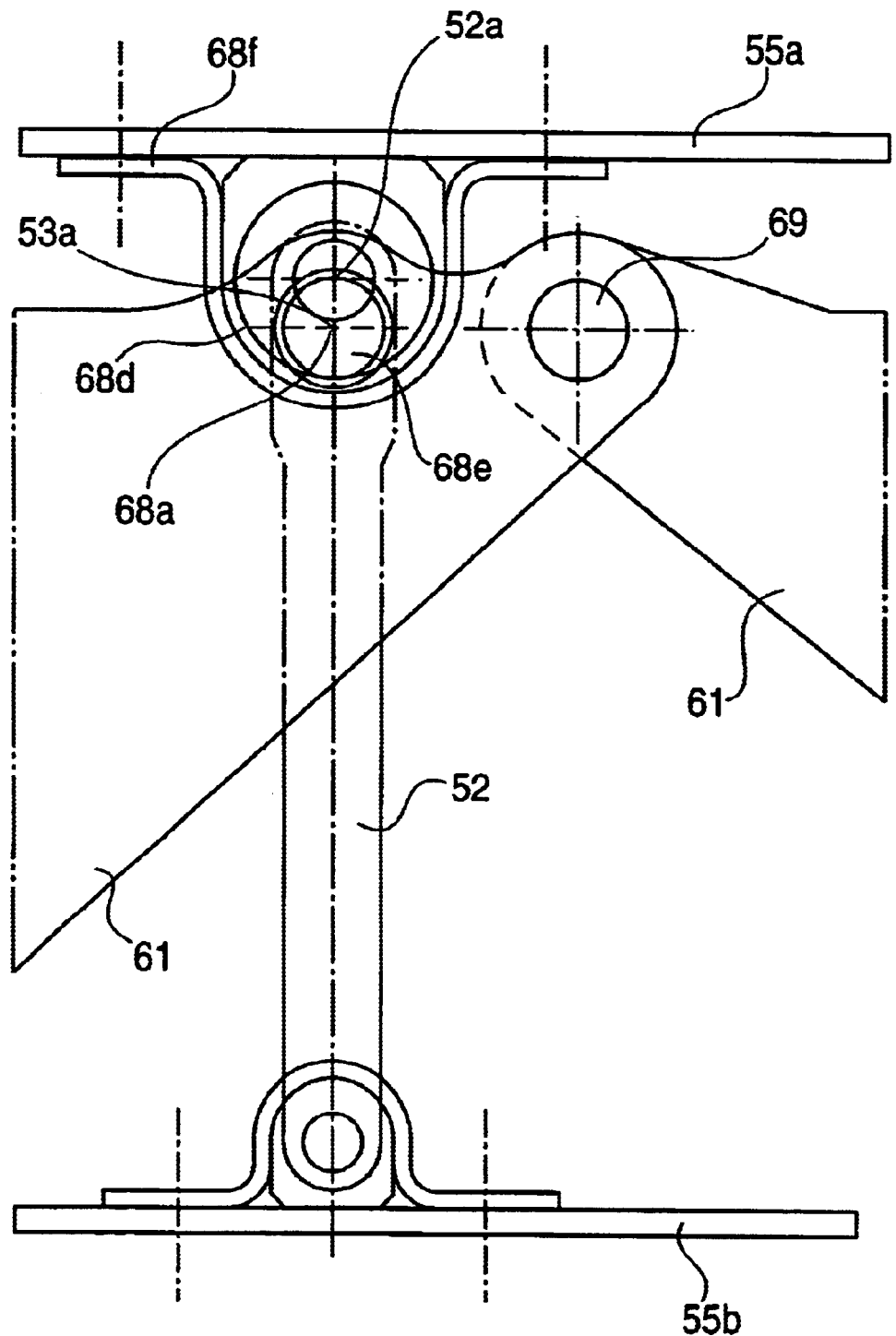
FIG. 5 illustrates a second example embodiment of the pivot bearing.
Figure 6:
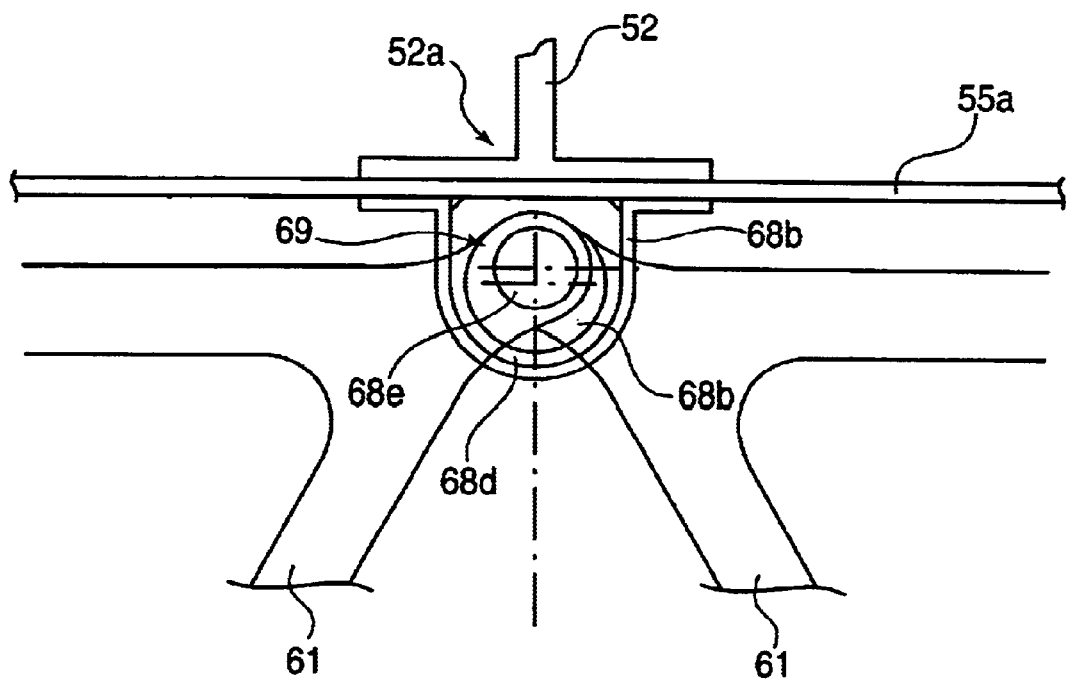
FIG. 6 illustrates a third example embodiment of the pivot bearing.

In longitudinal flap direction 12c, each trailing-edge segment 12a extends from a first end region 50 to a second end region 51. Also extending between these end regions 50, 51 is a driving mechanism 60, which extends in longitudinal flap direction 12c, and includes at least one backbone-type rib or a driving vertebra or vertebra 61 and a drive train 62 that is made of at least one variable driving chord 62a for tilting the at least one vertebra 61. When a plurality of vertebrae 61 are used, each of these are interconnected by a swivel joint 69, as well (FIGS. 4, 5, 6). Each vertebra 61 may be positioned between two spars 52, as illustrated in FIG. 3, or may also be offset from them in longitudinal direction 12c. In the latter case, suitable openings, through which vertebrae 61 extend, may be provided in spars 52. Each driving vertebra or vertebra 61 includes a variable-length profile chord 62a, in order to move vertebra 61 by a connection point 63 and a transmission element 64, which is used to transmit the rotational motion to torsion boxes 53, and is spaced apart from driving chord 62a in vertical direction 12d. A plurality of driving chords 62a and vertebrae 61 may be arranged in a row, in longitudinal direction 12c. However, the present invention may also be include only one vertebra 61 and only one driving chord 62a.

In order to transmit the rotational motion to torsion boxes 53, each transmission element 64 is connected at a pivot point 64a, 64b, by a pendulum joint 68, to a connection point or a pivot point 53a on a component of torsion box 53. Pendulum joint 68 ensures a pendulum motion in response to the profile adjustment between pendulum joint 68, i.e., the end of transmission element 64, and the corresponding connection point 53a at first wing skin 55a, in order to compensate for the longitudinal movement between the wing skin and the at least one transmission element 64, in response to each adjustment. In a special case, pivot points 64a, 64b may be provided at the corner points of transmission element 64 (FIGS. 3, 4, 6). Pivot point 53a for positioning pendulum joint 69 on the side of the torsion box may be provided at the specific, adjacent wing skin 55a, 55b, referred to below as first wing skin 55a (FIGS. 3, 5, 6). In the example embodiments illustrated in FIGS. 3 to 11, the first wing skin is upper, i.e., suction-side wing skin 55a. In the example embodiment illustrated in FIG. 12, the first wing skin is lower wing skin 55b. Pivot point 53a may also be arranged on spar 52 (FIG. 4).

In interaction with driving vertebrae 61, the action of driving mechanism 60, i.e., the change in length of driving chords 62a, changes the geometric shape of torsion boxes 53, so that the positions of first 55a and second 55b wing skins are also changed absolutely and relatively to each other. The shape of the variable wing section is also changed in this manner.

Various example embodiments of the pendulum joint 68 between vertebrae 61 and torsion box 53 are illustrated in FIGS. 4 to 7. In the example embodiment illustrated in FIG. 4, swivel joint 69 is a first pivot point 68a for a pendulum 68b of pendulum joint 68. The second pivot point of pendulum 68 is pivot point 53a, which represents the support on the side of the torsion box. This is provided on a holding device or mounting support 68c at spar 52. A movement of vertebrae 61 relative to torsion box 53 is rendered kinematically possible by the rotational motion of pendulum 68b as a part of pendulum joint 68.

In the example embodiment illustrated in FIG. 5, pendulum joint 68 has the shape of an eccentric or cam joint. First pivot point 68a of pendulum joint 68 at vertebrae 61 is positioned to be offset from vertebra joint 69. However, it may also coincide with vertebra joint 69. The second hinge point 53a for the positioning of pendulum joint 69 on the side of the torsion box, is provided on first wing skin 55a, and is an eccentric bushing 68d, which is attached to first wing skin 55a, at an appropriate mounting support or fastening sleeve or stringer 68f. A joint pin 68e eccentrically positioned in eccentric bushing 68d connects the two pivot points 68a, 53a. As viewed in wing-span direction 10, support point 52a of spar 52 on first wing skin 55 is offset from pivot point 53a on the side of the torsion box. Relative movements between vertebrae 61 and torsion box 52 are rendered possible by the eccentric position of joint pin 68e in the eccentric bushing.

In the example embodiment illustrated in FIG. 6, pendulum joint 68 also includes an eccentric bushing 68d that is arranged in a mounting support or a mounting sleeve 68f, as well as a joint pin 68e. Joint pin 68e is eccentrically positioned in eccentric bushing 68d, in order to compensate for the mentioned change in length in response to the variation of the trailing-edge curvature. In contrast to the pendulum joint illustrated in FIG. 5, pendulum joint 68 illustrated in FIG. 6 provides for joint pin 68e additionally being the joint axis of the two vertebrae 61 interconnected at this point, so that the joint pin simultaneously forms vertebra joint 69. Therefore, vertebra joint 69 is arranged in pendulum joint 68. As illustrated in FIG. 6, spar 52 is elastically connected to first wing skin 55a on its inner side. This may be accomplished, for example, using connection elements. This alternative is provided for the construction of drive train 62 in the form of a gondola arrangement illustrated in FIG. 12. When drive train 62 is positioned inside torsion boxes 53, spar 52 may be attached to the side of the wing skin, on which vertebrae joint 69 and pendulum joint 68 are arranged.

Figure 7:
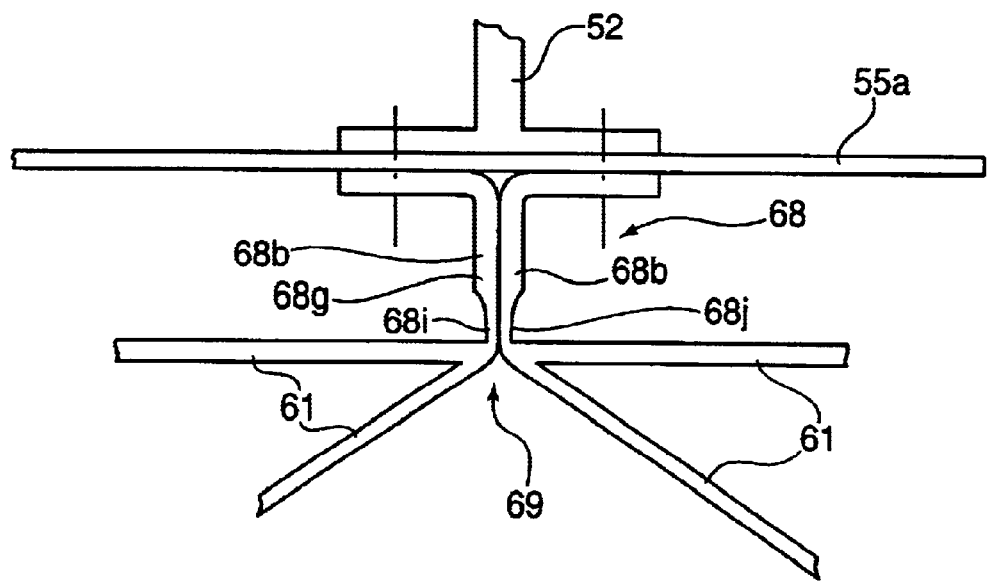
FIG. 7 is a cross-sectional view of the segment illustrated in FIG. 4, the pivot bearing being in the form of an elastic bearing.
Figure 8:
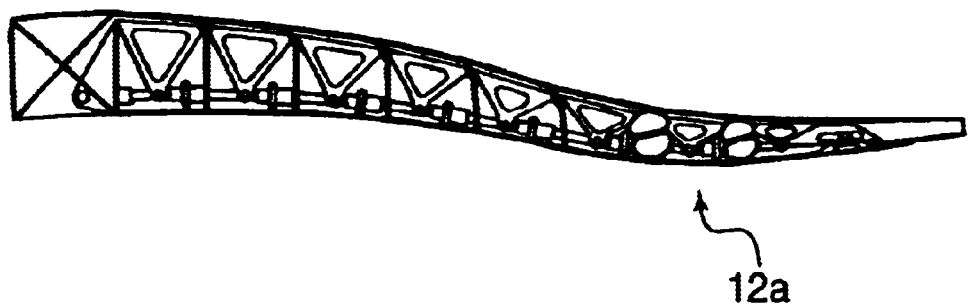
FIG. 8 is a cross-sectional view of the trailing-edge region of the wing illustrated in FIG. 1, in the flow direction, the trailing-edge region having a shape that may produce high lift for the entire wing, along with an optimized load distribution.
Figure 9:
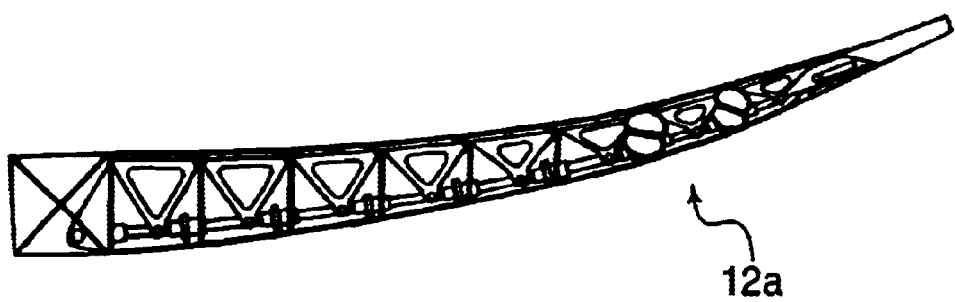
FIG. 9 is a cross-sectional view of the trailing-edge region of the wing illustrated in FIG. 1, in the flow direction, the trailing-edge flap having a shape, which allows a roll load to be generated for the entire wing.
Figure 10:
FIG. 10 is a cross-sectional view of the trailing-edge region of the wing illustrated in FIG. 1, in the flow direction, the trailing-edge region having a shape, which allows a maneuvering load acting from below on the wing, i.e., on its concave side, to be generated for the entire wing.
Figure 11:
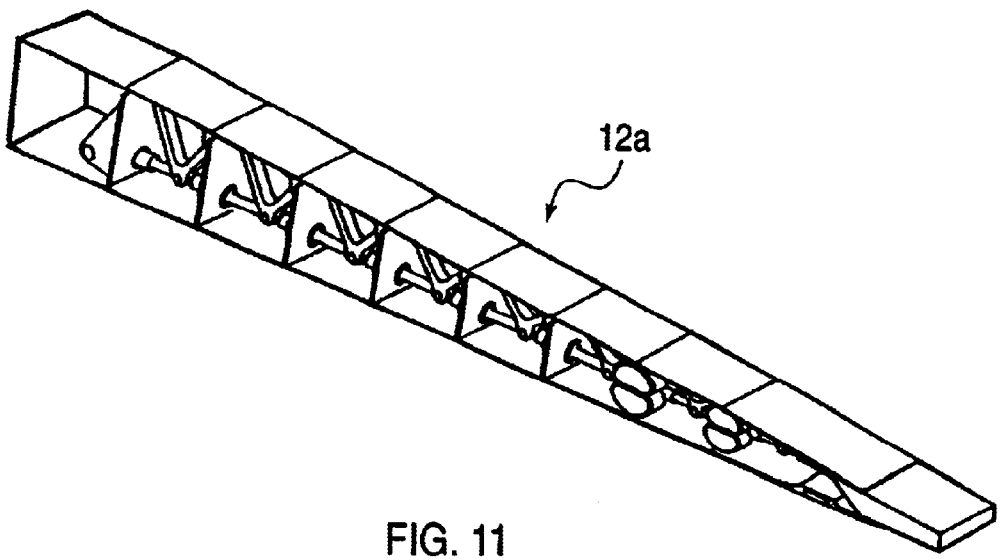
FIG. 11 is a perspective view of a segment of an example embodiment of the variable-curvature trailing-edge region in the neutral position, having a line of vertebra elements and the associated wing skin, the line of vertebrae being positioned inside the wing.
Figure 12:
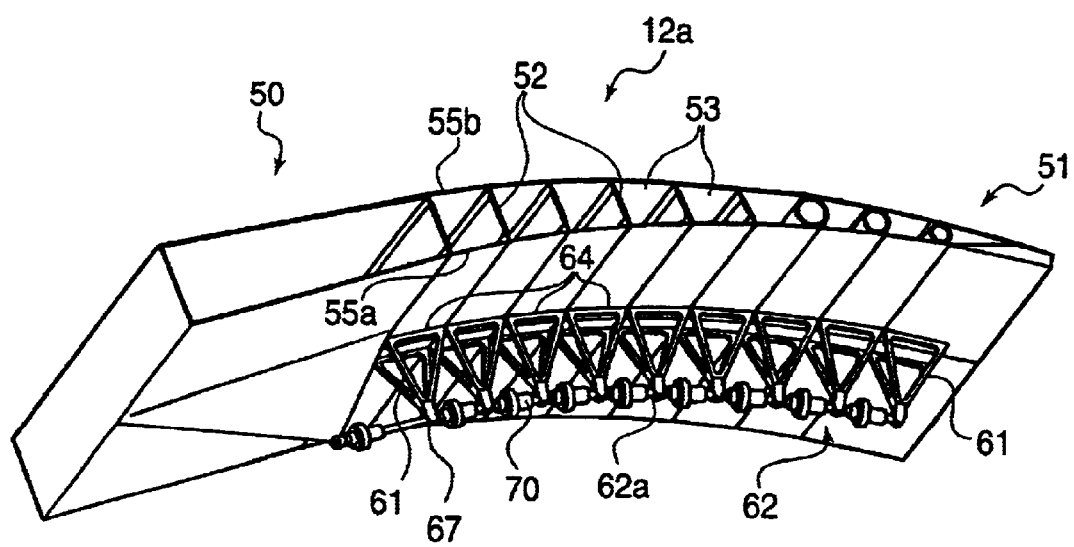
FIG. 12 is a perspective, bottom view of a segment of the trailing-edge region in a curved position, as an example embodiment of the variable-curvature airfoil wing according to the present invention, having a line of vertebra elements and the associated wing skin, the line of vertebrae being positioned below the wing in a gondola arrangement.

A further example embodiment of joints 68, 69 is illustrated in FIG. 7, where the two are configured as elastic joints. Pendulum 68b is attached to first wing skin 55a, using an elastic connection. In order to optimize the ability of pendulum 68b to swing, it is constructed in two pieces, perpendicularly to its rotating motion, with a first 68g and a second 68h pendulum part. In response to a swinging motion of pendulum 68b, vertebrae 61 and torsion boxes 53 slide on each other in their longitudinal direction, due to their relative movement. In addition, a vertebrae 61 is connected to each pendulum part 68g and 68h by connection points 68i and 68j, respectively, so that, in each instance, one vertebra 61 and one pendulum part 68g or 68h are formed together in one piece, out of elastic material. When vertebrae 61 and torsion boxes 53 move relatively to each other, the result is bending in connection points 68i and 68j, sliding motion between first 68g and second 68h pendulum parts, as well as additional bending between the pendulum parts and their mounting on first wing skin 55a.

In the example embodiment illustrated in FIGS. 3 to 11, driving mechanism 60, which has the drive train that includes at least one drive chord 62a and one actuator 70, is arranged inside segment 12a. Each spar 52 includes an opening 72a, through which drive train 60 runs. When vertebrae 61 are positioned to be offset from the torsion boxes, vertebrae 61 also extend through the opening. As an alternative, drive mechanism 60 can also be situated outside segment 12a, e.g. in the gondola arrangement illustrated in FIG. 10.

Drive train 62 or each drive chord 62a extends in vertical direction 12d, spaced apart from respective transmission element 64. In this context, a connection piece 65 of the vertebra leads from transmission element 64 to a connection point 63, at which a joint 67 connects vertebra 61 to a corresponding drive chord 62a. Joint 67 may also be an elastic joint. Transmission element 64 extends along one or more wing-skin segments 56a of first wing skin 55a, which may be the upper, i.e., suction-side, or the lower, i.e., pressure-side, wing skin. Therefore, the at least one transmission element 64, but, e.g., several transmission elements 64, determines or determine the shape of the wing skin on one side of a torsion box 53.

By the change in length of the at least one drive chord 62a, brought about by a control signal sent to the corresponding actuator, at least two vertebrae 61 are swivelled relatively to each other, since connection pieces 65 transmit the movement of joints 67 relative to each other, to the corresponding transmission elements in a lever-like manner. If a plurality of profile chords 62a and, accordingly, a plurality of actuators 62a are provided, then all or only a selection of actuators 70 are activated as a function of the profile shape to be attained, using an actuating signal corresponding to this profile shape. Due to the lever action of connection pieces 65, transmission elements 64 are tilted, and therefore, the profile of first wing skin 55a, to which the transmission elements are assigned in the particular example embodiment, is tilted as well. Therefore, the profile shape of the variable wing section is changed in a predetermined manner, using the torsional stiffness of torsion boxes 53.

Drive chord 62a is configured so that it may be lengthened or shortened with respect to its neutral length, as a function of appropriate control inputs. To this end, an actuator 70 is provided which may be integrated into a drive chord 62a in a mechanical manner. Any actuator that fulfills the special requirements of the application case may be provided. Each actuator 70 may be individually controllable. Therefore, e.g., bringing in or extending at least one actuator 70 causes the ribs 61 connected to it to rotate or tilt. Drive elements or actuators 62b may include motors. For example, a traveling-wave motor or a worm drive may be provided. The latter conventional and may include a continuous drive shaft and a nut having a drive thread, which interacts with or fits onto a corresponding thread of the drive shaft. Electro-rheological fixing films are arranged on the drive shaft, which interact with electro-rheological fixing films correspondingly arranged on the nut. The drive shaft is moved in and out by appropriately applying voltages to the electro-rheological fixing films.

In certain example embodiments of the wing or wing section according to the present invention, larger movements between upper wing skin 55a and lower wing skin 55b may occur in the end region, e.g., in the downstream end region 51 of the variable wing section. At least one spacer 81 attached to opposite wing skins 55a, 55b, and optionally, a guide device 78 having an end piece 77, are provided in order to support these movements and simultaneously keep upper 55a and lower 55b wing skins at a predetermined distance from each other in this segment (cf. FIG. 3, as well as FIGS. 13 to 17).

Figure 13:
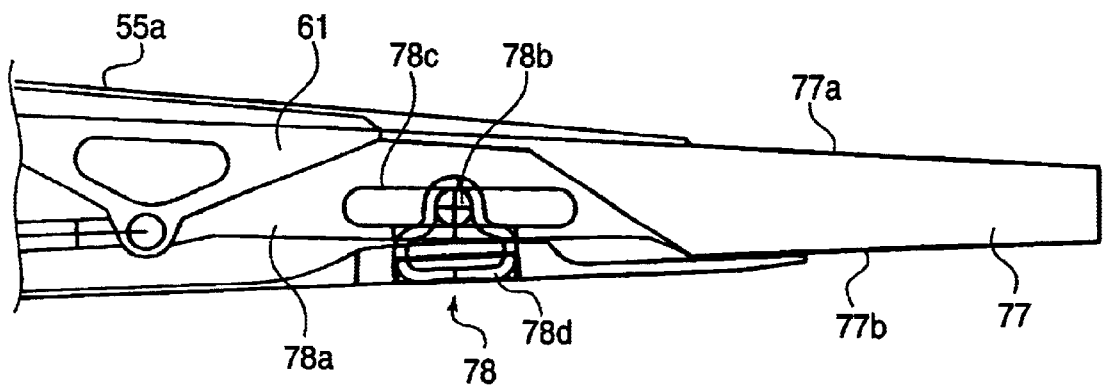
FIG. 13 is a cross-sectional view of a rear segment of the trailing-edge region, as viewed in the flight direction, having a first example embodiment of a guide device for supporting the wing skin at an end piece of the profile.
Figure 14:
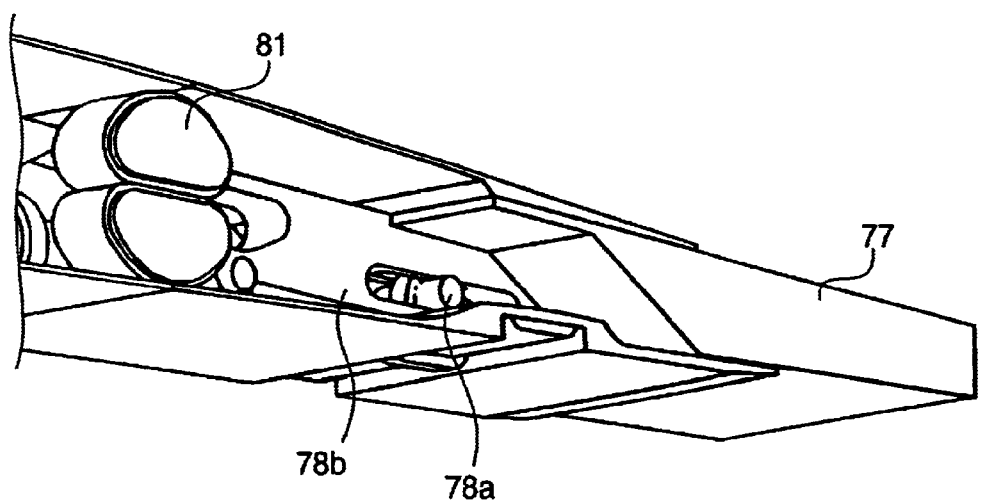
FIG. 14 is a perspective view of a part of the section illustrated in FIG. 13.

Guide device 78, an example arrangement of which is illustrated in FIGS. 3, 13, and 14, may be provided to ensure that wing skins 55a, 55b are supported at profile end piece 77, in each adjusted position of torsion boxes 53. A spacer 78a connected to the wing skins is hinged to joint 67 of rearmost vertebra 61, i.e., of the vertebra arranged furthest downstream in longitudinal direction 12c. Spacer 78a may be connected to first wing skin 55a. Spacer 78a forms a radius link with a guide element 78b, which is connected to second wing skin 55b.

An example embodiment of the radius link according to the present invention includes a guideway 78b, which is provided in spacer 78a, extends in longitudinal direction 12a, may be configured as a slotted hole or a groove, and includes guide element 78b sliding in it, which is, for example, configured as a pin. The pin itself is mounted to second wing skin 55b, i.e., to the wing skin not connected to vertebrae 61, using a sleeve. The interaction of guideway 78b with guide element 78b holds wing skins 55a, 55b at end piece 77.

An end piece 77 of the variable wing section may be attached to this spacer 78a. This end piece may also be formed in one piece with spacer 78a. Wing skins 55a, 55b rest on the end piece, i.e., they slide on the end piece in response to the variable wing section being adjusted. Depending on the requirements for the profile shape, the cross-section of end piece 77 may be formed in the shape of a trapezoid in the example embodiments illustrated in FIGS. 3 to 18, and, depending on the position of wing skins 55a, 55b, the end piece protrudes more or less far, beyond wing skins 55a, 55b, in the downstream direction. Therefore, an end section of first wing skin 55a rests on a first contact surface 77a, and the end section of the second wing skin rests on a second contact surface 77b of end piece 77.

Figure 15:
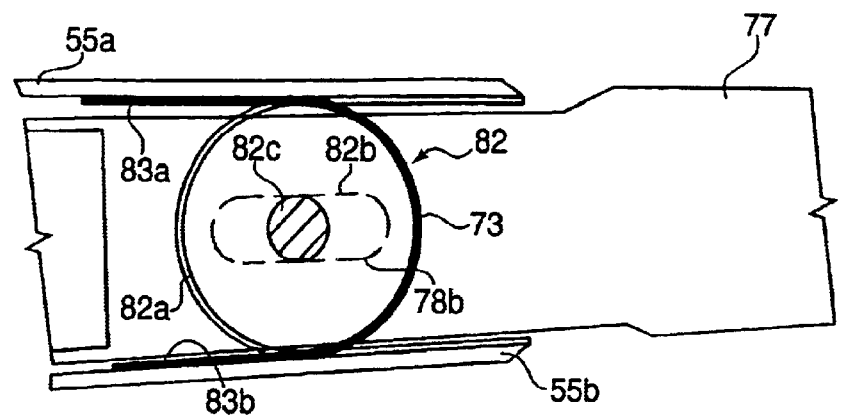
FIG. 15 is a side view of an alternative configuration of the guide device illustrated in FIG. 13.
Figure 16:
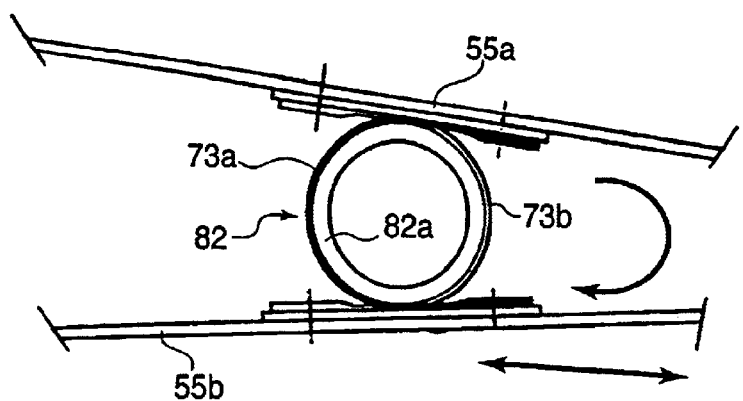
FIG. 16 illustrates a spacer, which has the function of a length-compensation element in an end region of the variable wing.
Figure 17:
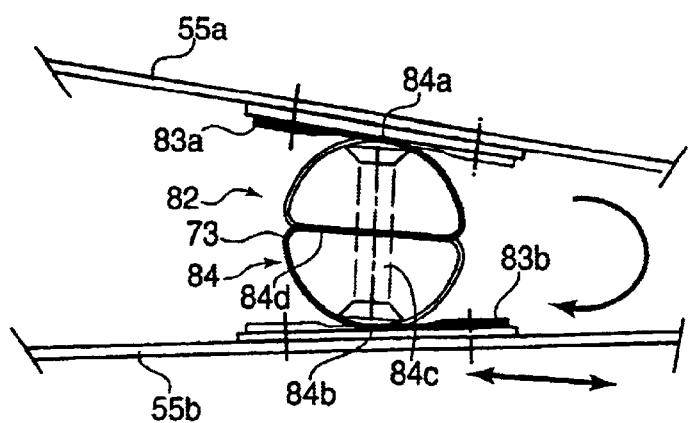
FIG. 17 illustrates an alternative example embodiment of the spacer.

In addition, at least one spacer 81 in the region behind last downstream vertebra 61 is assigned the function of keeping the two opposite wing skins 55a, 55b at a minimum distance from each other, and simultaneously allowing relative movements of the two while functioning as a moving joint free from play. Spacer 81 may also be provided at other positions of the variable wing section and may be configured in accordance with varying example embodiments, three of which are illustrated in FIGS. 15 to 17. In these example embodiments, spacer 81 includes a band 73, which has a low flexural stiffness and may be made of spring steel or fibrous composite material (FCM), and the two free spring arms 83a, 83b of which surround a center piece 82 that rotates in response to the occurrence of a relative movement of wing skins 55a, 55b.

In the example embodiment illustrated in FIG. 15, free spring arms 83a, 83b are prestressed against opposing wing skins 55a, 55b or attached to them, and center piece 82 is supported by an inner cylinder or truncated cone 82a. End piece 77, from which spacer 81 is offset in the wing-span direction, includes a guideway 82b in its interior, which extends in longitudinal wing-section direction 12c, is in the form of, e.g., a slotted hole or a groove, and interacts with a guide pin 82c that is a component of spacer 81.

In the case of spacer 81 in the example embodiment illustrated in FIG. 16, the elastic band is attached to opposing wing skins 55a, 55b. Spring arms 83a, 83b are connected to first 55a and second 55b wing skins, respectively, using connection elements or connecting methods. The midsections of a plurality of bands 73 are placed around a cylinder or truncated cone 82a. Illustrated in FIG. 16 is an example embodiment, which includes a first band 73a and a second band 73b that is placed around center piece 82 in opposition to first band 73a. The bands are arranged next to each other in wing-span direction 10. Each mid-section 82 is placed around inner cylinder 82a and attached or secured to it. Other than that, cylinder 82a does not interact with a component of the variable wing section, via a guideway and guide-pin set-up. Due to the movement of free spring arms 83a, 83b, cylinder 82a may rotate in response to a relative movement of opposing wing skins 55a, 55b, while, because spring arms 83a, 83b are fixed, spacer 81 still performs its support function or maintains the space with respect to or between opposite wing skins 55a, 55b. Therefore, spacer 81 illustrated in FIG. 15 fulfills the function of a moving joint free of play, in response to first 55a and second 55b wing skins moving relatively to each other.

In the example embodiment illustrated in FIG. 17, the ends of free arms 83a, 83b are aligned in opposition to each other. Mid-section 82 of band 73 is held by a two-piece cylinder 84 having a first part 84a and a second part 84b. The two parts extend in wing-span direction 10, and each includes a semicircular cross-section, their plane surfaces being contiguous and attached to each other by a pin 84c. Band 73 is S-shaped and placed around the outer sides and between the plane surfaces of parts 84a, 84b, so that the band is wedged in by the action of pin 84c. A plurality of opposing bands 73a, 73b may also be provided, which are mutually offset from each other in wing-span direction 10.

The variable wing section according to the present invention may be configured as a leading-edge flap or slat 11, in a manner analogous to trailing-edge flaps 12. An example embodiment of this is described below.

Figure 18:
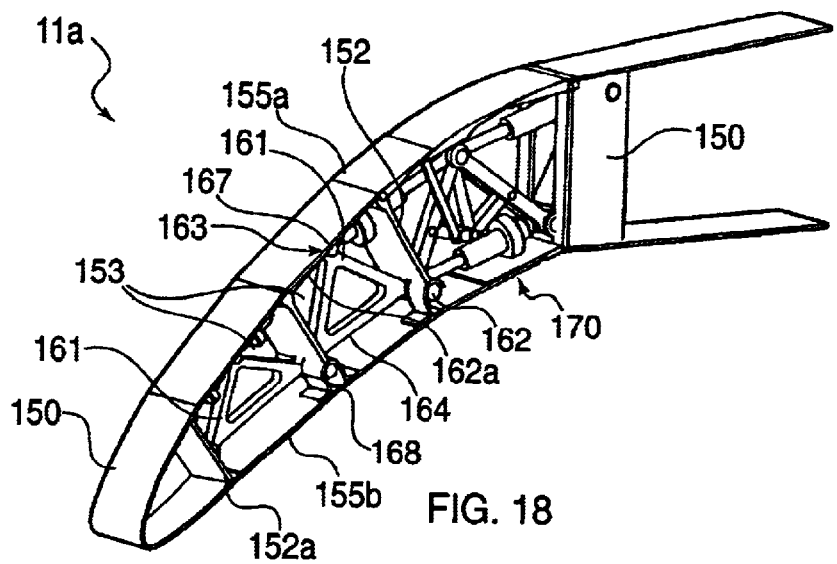
FIG. 18 is a perspective view of a segment of the variable-curvature leading-edge region in a curved position, the segment extending in a direction perpendicular to the leading-edge line and having a line of vertebra elements and the associated wing skin, and the line of vertebrae being positioned inside the wing.
Figure 19:
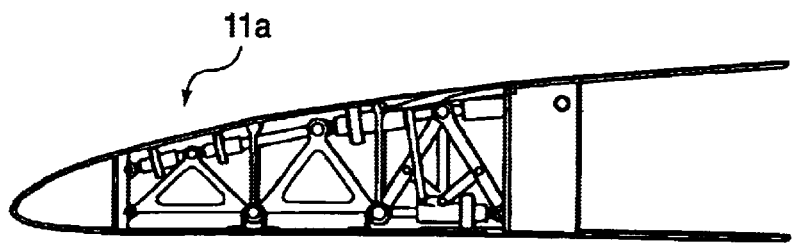
FIG. 19 is a cross-sectional view of the leading-edge region illustrated FIG. 18 taken perpendicular to the leading-edge line, and the leading-edge region being in the neutral position.
Figure 20:
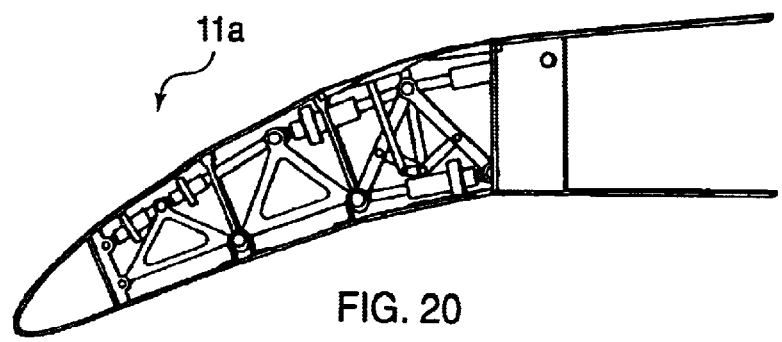
FIG. 20 is a cross-sectional view of the leading-edge region illustrated in FIG. 18 taken perpendicular to the leading-edge line, and the shape of the leading-edge region producing a high-lift configuration.

FIGS. 18 to 20 illustrate one of several leading-edge flap segments or flap segments 11a of leading-edge flap 11 positioned next to each other in wing-span direction 10. As seen in longitudinal flap direction 12c, each flap segment 11a is formed from at least two torsion boxes 153, each torsion box 153 being bound in longitudinal direction 12c by two spars 152, and alternatively, in an end region of the flap segment, by a spar 152 and a support element 152a of an end region 150, and by a first wing-skin segment 155a and a second wing-skin segment 155b. In a manner analogous to that of the example embodiment illustrated in FIGS. 3 to 12, at least one vertebra 161, which includes a transmission element 164, a profile cord 162a, as well as an actuator 162b, is positioned inside or outside torsion boxes 153. Transmission element 164 extends along first wing skin 155a. Profile cord 162 is pivoted at vertebra element 161, using a swivel joint 167. Vertebra elements 161 are pivoted at spars 152 and/or first wing skin 155a in a described manner, using pendulum joints 168, so that relative movement, which occur between wing skin 155a and vertebrae 161 in response to adjusting the variable wing section, are compensated for.

Leading-edge flap 11 may include an end region 51 on one or both ends, as illustrated in FIG. 3. However, the movements of first wing skin 155a relative to second wing skin 155b may also be absorbed by overlapping regions 170, which function as aerodynamic seals. Such an overlapping region 170 may be provided at the first or the second or both wing skins.

By operating corresponding drive elements 154 using control inputs, the length of corresponding profile cord 162, and therefore the shape of each torsion box 153, may be brought into a predetermined shape.

Piezoelectric elements, which support the movements of vertebra elements 61 and 161, may be attached to the wing skin of leading-edge and trailing-edge flaps 11 and 12, respectively.

Leading-and trailing-edge flaps 11 and 12, respectively, of the present invention are not only intended for airplanes, but may also be used in vehicles in general, e.g., for spoiler wings or spoilers, even when there are different dimensional ratios in this case. In order to render the profile of wing boxes 3 variable, they may also be configured according to the described principle for achieving the object of the present invention.

What is claimed is:

1. A variable wing section having an adjustable profile shape extending in a wing-span direction, comprising:
    a plurality of torsion boxes arranged in a longitudinal direction of the wing section and torsionally stiff about the wing-span direction, each torsion box including a first wing skin, a second wing skin opposite the first wing skin and at least one spar; and at least one vertebra including a transmission element connected to the first wing skin by a pendulum joint configured to compensate for a relative movement between the first wing skin and the at least one vertebra, the at least one vertebra including a vertically spaced-apart point of connection to at least one drive chord having a length changeable in accordance with a control command;

wherein the length of the drive chord is configured to change as a function of a control signal; and wherein the at least one vertebra is configured to rotate about the wing-span direction so that a shape of the torsion boxes and the profile shape are changed in a predetermined manner.

2. The variable wing section according to claim 1, wherein the at least one vertebra includes a plurality of vertebrae positioned one behind another in the longitudinal direction, each of the plurality of vertebrae connected to the drive chord.

3. The variable wing section according to claim 1, wherein the at least one vertebra and the at least one drive chord are arranged inside the torsion boxes.

4. The variable wing section according to claim 1, wherein the at least one vertebra and the at least one drive chord are arranged outside the torsion boxes.

5. The variable wing section according to claim 1, wherein the pendulum joint includes an elastic joint and wherein each transmission element is connected on one side via elastic connections to an upper wing skin and to a spar.

6. The variable wing section according to claim 1, wherein the pendulum joint includes an eccentric joint, each vertebra being eccentrically supported in an eccentric bushing.

7. The variable wing section according to claim 1, wherein the pendulum joint includes a pendulum connecting each vertebra to one of a spar and the first wing skin.

8. The variable wing section according to claim 1, wherein the variable wing section includes a trailing-edge flap of an airfoil wing.

9. The variable wing section according to claim 1, wherein the variable wing section includes a leading-edge flap of an airfoil wing.

* * * * *

UNITED STATES PATENT AND TRADEMARK OFFICE
CERTIFICATE OF CORRECTION

PATENT NO. : 6,644,599 B2
DATED : November 11, 2003
INVENTOR(S) : Juan Perez

It is certified that error appears in the above-identified patent and that said Letters Patent is hereby corrected as shown below:

Column 3,
Line 4, after "segments" change "1a" to -- 11a --.

Signed and Sealed this

Tenth Day of August, 2004

JON W. DUDAS
*Acting Director of the United States Patent and Trademark Office*